May 25, 1965 C. A. ANDREWS 3,185,826
CORE ADDER
Filed April 4, 1960
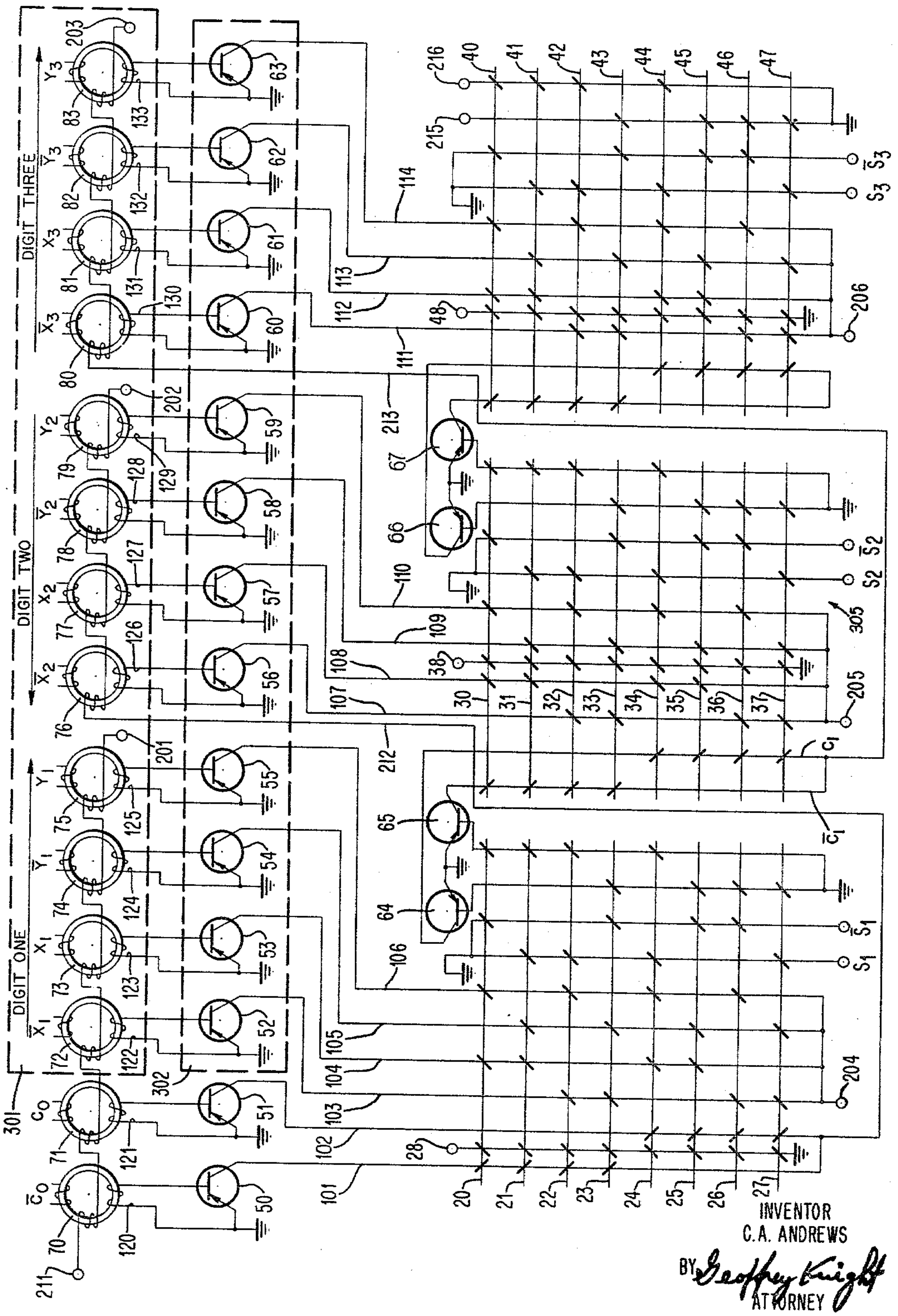
INVENTOR
C.A. ANDREWS
BY Geoffrey Knight
ATTORNEY United States Patent Office 3,185,826
Patented May 25, 1965

3,185,826
CORE ADDER

Carroll A. Andrews, Poughkeepsie, N.Y., assignor to International Business Machines Corporation, New York, N.Y., a corporation of New York Filed Apr. 4, 1960, Ser. No. 19,703
6 Claims. (Cl. 235—175)

This invention relates in general to digital computers and more particularly to binary digital adders.

In certain types of digital computers (using what is herein termed pulse logic) binary numbers are represented by voltage pulses rather than by the ON or OFF condition of a D.C. level as is done in the usual type of computer. When using pulse logic, timing becomes exceedingly important since certain logical circuits like certain core matrices require that all of the input signals be simultaneously present. If the timing is not accurately controlled the pulses on one of the inputs may terminate before the pulses on the second input arrive and, hence, the logical circuits will not operate correctly.

Herein we are specifically concerned with binary digital adders which have a relatively large number of digital positions. The logical circuits which perform the addition in each digital position (full adders) receive inputs from a plurality of sources. First, each full adder receives one augend digit from an augend register and one addend digit from an addend register; second, each full adder receives a carry signal from the next lower digital position.

In the usual type of binary digital adder, the augend and addend digits are supplied to the full adder circuits from registers which represent the augend and addend digits by appropriate D.C. levels on the register output lines. The registers maintain their outputs constant until the registers are reset by a reset signal. The operation of the adder circuits for the various digital positions can proceed sequentially starting with the lowest order digital position and terminating with the highest order position. Each full adder operates only after it has received a carry signal from the previous digital position. Since the augend and addend signals persist until the registers are reset, the augend and addend signals are always present when the carry signals arrive at the various digital positions.

With pulse logic, however, the augend and addend input signals are only present for a very short time. Where the numbers to be added have a large number of digital positions, the time required for a carry to propagate from the lowest to the highest order digital position is greater than the length of time during which the augend and addend signals persist. Hence, the augend and addend signals cannot be supplied to all the digital positions simultaneously.

It is the object of this invention to provide circuitry for sequentially supplying the various augend and the various addend signals to the various digital positions of a logical adder.

A further object of this invention is to provide an adder circuit wherein coincidence between the operand signals and the carry signals is insured.

A further object of the invention is to provide an improved circuit for reading information from a register into a logical adder.

A further object is to provide circuitry for timing the read-out of an information register.

The foregoing and other objects, features and advantages of the invention will be apparent from the following more particular description of the preferred embodiment of the invention, as illustrated in the accompanying drawing.

In the drawing:

FIG. 1 is a schematic drawing of an embodiment of my invention.

For ease in explanation, the invention will be shown and described herein with reference to an adder which has three digital positions. The circuitry shown for these three digital positions is illustrative of the circuitry which would be used in each position of a digital adder which might have any number of digital positions.

The circuitry will first be explained generally with reference to the second digital position. Later a more detailed explanation of the circuitry will be given.

The augend and the addend digits are stored in magnetic core registers 301. For the second digital position the augend digit $X_2$ is stored in the magnetic cores 76 and 77 and the addend digit $Y_2$ is stored in the magnetic cores 78 and 79. If a number is stored in the registers, at least two of the four cores 76 to 79 will be set.

The second digital position of the augend and addend registers is read out by a reset pulse on line 212. The read out of the registers produces pulses on two of the four lines 126 to 129. These pulses are amplified by transistors 56 to 59 and applied to circuits 107 to 110. The output pulses along with a carry from the next lower digital position are fed into the full adder core matrix comprising magnetic cores 30 to 37 which produces sum, no sum, carry and no carry signals.

Satisfactory operation of the adder core matrix requires that the augend and addend signals arrive at the core matrix at the same time that the carry or no carry signals from the next lower digital order arrive. Herein, coincidence between the carry signals and the augend and addend signals is insured because the magnetic core register reset (or read out) line 212 is activated by the carry or no carry signal which was supplied to the next lower digital order.

The time required for the carry signal $C_0$ or not $C_0$ to change the state of one of the cores 20 to 27 and to produce a signal on the $C_1$ output or on the not $C_1$ output (as will be seen later each time an adder matrix operates, one core changes state thereby producing a carry output signal) plus the time required for this signal to be amplified by transistors 64 or 65 is equal to the time required for the reset line 212 to read out the cores 76 to 79 thereby producing a signal on two of the lines 126 to 129, plus the time required for the resulting output signals to be amplified by the transistors 56 to 57. Hence the augend and addend signals and the carry signals or the no carry signals arrive at the adder matrix 305 at the same time.

More generally stated, the read out of the augend and of the addend register cores for each digital position (except the first) is initiated by the carry or no carry signals which were supplied as an input to the previous digital position. The same scheme here shown as applied to the second and third digital positions could be extended to any number of digital positions.

Described more specifically, elements 70 to 83, 20 to 27, 30 to 37, and 40 to 47 are magnetic cores which have two stable states. The stable states of the magnetic cores will hereinafter be called the positive state and the negative state.

The magnetic cores 301 comprise two registers. Cores 72, 73; 76, 77; 80 and 81 comprise the augend register and cores 74, 75; 78, 79; 82 and 83 comprise the addend register. Each register therefore has two cores associated with each digital position. One of the cores is switched to the positive magnetic condition to indicate that a one is stored in the respective digital position, and the other magnetic core is switched to the positive magnetic condition to indicate that a zero is stored in the respective digital position.

Core 71 is switched to the positive condition to indicate that there is a carry into the least significant digital position, and core 70 is switched to the positive condition to indicate that there is no carry into the least significant digital position.

Reset or read out windings 211, 212 and 213 are wound so that when they are activated, the associated cores are forced into the negative magnetic condition. Those cores which are in the positive condition when the associated read out winding is activated will produce pulses on the associated output windings 120 to 133. Any pulses appearing on windings 120 to 133 are amplified by the associated transistors 50 to 63. In this embodiment, the transistors are PNP silicon drift transistors which are activated by negative pulses on the base lines.

Each digital position has associated therewith a magnetic core full adder. At the beginning of each adding operation all the cores 20 to 27, 30 to 37, and 40 to 47 are in the negative magnetic state. (As will be seen later, the reset windings 28, 38 and 48 placed the cores in the negative state at the end of the previous addition.) The cores in each digital position are so wound that any combination of carry, augend and addend inputs will only switch one core from the negative to the positive magnetic state. Half of the cores are driven positive by the carry winding and half of the cores are driven positive by the no carry winding; however, the augend and addend windings inhibit all of the cores except one from changing to the positive state.

Each core will switch to the positive condition when the specific condition set out below exists.

| Core: | Condition |
|---|---|
| **20, 30, 40** | $\bar{x}\bar{y}\bar{c}$ |
| **21, 31, 41** | $\bar{x}y\bar{c}$ |
| **22, 32, 42** | $x\bar{y}\bar{c}$ |
| **23, 33, 43** | $xy\bar{c}$ |
| **24, 34, 44** | $\bar{x}\bar{y}c$ |
| **25, 35, 45** | $\bar{x}yc$ |
| **26, 36, 46** | $x\bar{y}c$ |
| **27, 37, 47** | $xyc$ |

In the embodiment shown herein, the time duration of the pulses produced by the transistors 302 is approximately one-half microsecond. This duration may be increased where desired by stretching circuits as explained hereinafter. Since the augend and addend lines are inhibit lines, it is essential that the pulses thereon last during the entire duration of the carry drive pulses. Thus, pulse stretching means (not shown) for the circuits 101 to 114 may be added, together with other hereinafter described timing modifications, to insure that the augend and addend pulses last during the entire duration of the carry pulses even though there may be variations in the amount of delay introduced by the various elements.

The output carry, no carry, sum and no sum windings for each digital position are wound on the appropriate cores. The output carry and no carry windings are wound so that a negative pulse appears on one or the other of them when one of the associated cores is switched from the negative to the positive state by a pulse on either the input carry or no carry winding. Likewise, a pulse appears on either the sum or on the no sum winding when a core changes state.

The reset windings 28, 38 and 48 are activated after the addition has been completed in all of the digital positions. The signals then appearing on the sum windings $S_1$, $\bar{S}_1$, $S_2$, $\bar{S}_2$, $S_3$ and $\bar{S}_3$ can be used to store the sum in the augend register. (The augend register would then be equivalent to an accumulator register.)

Points 201, 202 and 203 are connected to a minus twenty volt potential source through a seventy ohm resistor (not shown) and points 204, 205 and 206 are connected to a minus twenty volt potential source through an eighty ohm resistor (not shown). The magnitude of the resistors and potential sources will depend on the specific transistors used.

The carry and no carry output signals from the first and second digital positions are amplified by transistors 64, 65, 66 and 67 and then supplied as inputs for the next digital position. The third digit position carry-carry not signals appear at terminals 215, 216. Terminals 215, 216 either provide the readout for higher ordered digits as previously described or, if in the last digit position, they provide the end carry or not end carry signals for further logical operations.

As previously explained, coincidence between the augend, addend, carry and no carry signals in each digital position is insured by having the carry or no carry output signal lines from each digital position connected to the register reset winding for the next non-adjacent higher order digital position.

For example, the time period between the activation of a carry or a no carry winding for the first digital position and the arrival of the carry or no carry signal to the full adder consisting of cores 30 to 37 for the second digital position is composed of the delays introduced by the switching of (*a*) one of the cores 20 to 27 and the activation of one of the carry output windings $C_1$ or not $C_1$, and (*b*) the switching of one of the transistors 64 or 65. The time period between the activation of a carry or a no carry winding for the first digital position and the arrival of the augend and addend signals to the full adder for the second digital position is composed of the delays introduced by the switching of (*a*) two out of the four cores 76 to 79 and the activation of the output windings 126 to 129 and (*b*) the switching of two of the transistors 56 to 59. The two time periods above described are for all essential purposes equal. Since the second period is begun coincidentally with the first (in the example, by a single current pulse on line 212 extending between the collector of transistor 50 or 51 and supply terminal 202), coincidence between the carry and no carry signals and the augend and addend signals for each digital position is insured.

The teaching of the invention is susceptible of various alternate embodiments. Where utmost reliability is desired at the time cost of a single additional delay for the entire multibit adder device, the inhibit currents may be stretched and timed to bracket rather broadly the expected arrival of the carries. For example, the inhibit lines 103–114 may be provided with conventional stretcher circuits, such as by regenerative feed-back at their driving transistors 52–63, the $\bar{C}_0$ and $C_0$ signals on lines 120, 121 passed through conventional delays, and the carry-in signals to each adder matrix position connected not to the next higher order register position read winding but rather to the read winding of a still higher order, such as the next non-adjacent one. In this case the read signal of register digit TWO is connected in series with that of position ONE. Thus, at each position, the inhibits can be initiated well in advance of the carry arrival and be maintained until well after the carry has died out.

Accordingly, while the invention has been particularly shown and described with reference to a preferred embodiment thereof, it will be understood by those skilled in the art that the foregoing and other changes in form and details may be made therein without departing from the spirit and scope of the invention.

I claim:

1. An adder comprising in combination a multidigit magnetic core register for storing augend digits; a multidigit magnetic core register for storing addend digits; register read out means for each digital position for simultaneously reading out the respective augend and addend digits; adding means for each digital position, said adding means comprising means for producing a signal representative of the sum digit for the respective digital position and carry means for producing signals representative of either a carry or no carry out of the respective digital position, each of said adding means being responsive to the read out means for the respective digital position and to the carry means in the next lower digital position; and means in each of the respective digital positions connected to activate the register read out means in a higher order digital position, said means being responsive to the carry means in the respective digital position.

2. An adder comprising in combination a multidigit magnetic core register for storing augend digits; a multidigit magnetic core register for storing addend digits; register read out means for each digital position for simultaneously reading out the respective augend and addend digits; adding means for each digital position, said adding means comprising means for producing a signal representative of the sum digit for the respective digital position and carry means for producing signals representative of either a carry or no carry out of the respective digital position, each of said adding means being responsive to the read out means for the respective digital position and to the signals from the carry means in the next lower digital position; and means in each of the respective digital positions responsive to a signal from the carry means in the respective digital position for activating the register read out means in the next non-adjacent higher order digital position.

3. An adder comprising in combination a multidigit register for storing addend digits; a multidigit register for storing augend digits; adding means for each digital position, said adding means comprising means for producing a signal representative of the sum digit for the respective digital position and carry output means for producing a signal representative of either a carry or no carry out of the respective digital position; a register read out means in each digital position for providing pulses representative of addend and augend digits stored in said registers to said adding means thereby activating the adding means for the respective position, and means in each digital position connected to activate the register read out means in a higher order digital position, said last-mentioned means responsive to the carry output means for the respective digital position.

4. An adder comprising in combination a multidigit register for storing addend digits; a multidigit register for storing augend digits; adding means for each digital position, said adding means comprising means for producing a signal representative of the sum digit for the respective digital position and carry output means for producing a signal representative of either a carry or no carry out of the respective digital position; a register read out means in each digital position for providing pulses representative of addend and augend digits stored in said registers to said adding means thereby activating the adding means for the respective position, means in each respective digital position responsive to the carry output means for the respective digital position for activating the register read out means in the next higher order non-adjacent digital position.

5. An adder comprising in combination a multidigit register for storing addend digits; a multidigit register for storing augend digits; adding means for each digital position, said adding means including carry output means for producing a signal representative of either a carry or no carry out of the respective digital position; a register read out means in each respective digital position for providing pulses representative of addend and augend digits stored in said registers to said adding means thereby activating the adding means for the respective position; and means in each digital position connected to activate the register read out means in a higher order digital position, said last-mentioned means responsive to the carry output means for the respective digital position.

6. An adder comprising in combination a multidigit register for storing addend digits; a multidigit register for storing augend digits; adding means for each digital position, said adding means comprising means for producing a signal representative of the sum digit for the respective digital position and carry output means for producing a signal representative of either a carry or no carry out of the respective digital position; a register read out means in each respective digital position for providing pulses representative of addend and augend digits stored in said registers to said adding means thereby activating the adding means for the respective position; and means in each digital position connected to activate the register read out means in a higher order digital position beyond the higher order next to said respective order, said last-mentioned means responsive to the carry output means for the respective digital position.

References Cited by the Examiner

UNITED STATES PATENTS

| | | | |
|---|---|---|---|
| 2,626,752 | 1/53 | Williams | 235—174 X |
| 2,966,305 | 12/60 | Rosenberger | 235—175 |
| 3,081,032 | 3/63 | Kier et al. | 235—175 |

MALCOLM A. MORRISON, *Primary Examiner.*

WALTER W. BURNS, Jr., CORNELIUS D. ANGEL, *Examiners.*